United States Patent [19]

Fischer et al.

[11] 4,146,684

[45] Mar. 27, 1979

[54] ELECTROCHEMICAL STORAGE CELL

[76] Inventors: Wilfried Fischer, Am Kastanienberg 27, Neckargemünd, Fed. Rep. of Germany, 6903; Herbert Kleinschmager, Lessingstr. 23, Eppelheim, Fed. Rep. of Germany, 6901; Wilhelm Haar, Wingertstr. 57, Sandhausen, Fed. Rep. of Germany, 6902; Gert Weddigen, Kastellweg 8, Heidelberg-Neuenheim, Fed. Rep. of Germany, 6900; Wolfgang Rupp, Am Spitzerfeld 19, Neckargemünd, Fed. Rep. of Germany, 6903

[21] Appl. No.: 817,491

[22] Filed: Jul. 20, 1977

[30] Foreign Application Priority Data

Jul. 24, 1976 [DE] Fed. Rep. of Germany ....... 2633345

[51] Int. Cl.$^2$ ........................................... H01M 10/39
[52] U.S. Cl. .................................... 429/104; 429/191; 429/218
[58] Field of Search ................. 429/104, 103, 101, 30, 429/31, 191, 218, 232

[56] References Cited

U.S. PATENT DOCUMENTS

| | | | |
|---|---|---|---|
| 3,982,959 | 9/1976 | Partridge et al. | 429/163 |
| 4,024,320 | 5/1977 | Gibson et al. | 429/104 |
| 4,052,535 | 10/1977 | Robinson et al. | 429/104 |
| 4,070,527 | 1/1978 | King et al. | 429/104 |

*Primary Examiner*—Anthony Skapars
*Attorney, Agent, or Firm*—Herbert L. Lerner

[57] ABSTRACT

An electrochemical storage cell or battery based on an alkali metal and sulfur having at least one anode chamber and at least one cathode chamber separated from each other by an ion-conducting solid electrolyte, and felt with course-pores and/or low electric conductivity and felt with fine-pores and/or higher electric conductivity located in the cathode chamber, with the felt of coarse-pores and/or low conductivity disposed near the solid electrolyte and the felt of fine-pores and/or higher conductivity disposed further away from the solid electrolyte. This permits rapid and more complete recharging of the cell for covering peak loads in electrical networks.

9 Claims, 5 Drawing Figures

ELECTROCHEMICAL STORAGE CELL

BACKGROUND OF THE INVENTION

1. Field of the Invention

This invention relates to an electrochemical cell and more particularly refers to a new and improved electrochemical storage cell or battery based on alkali metal and sulfur with at least one anode chamber and at least one cathode chamber separated from each other by an ion-conducting solid electrolyte.

2. Description of the Prior Art

An electrochemical storage cell or battery based on alkali metal and sulfur having at least one anode chamber and one cathode chamber separated from each other by an ion-conducting solid electrolyte, and a felt fabric of graphite or carbon contained in the cathode chamber in addition to the sulfur is known in the art as shown by German Published Prosecuted Application No. 1,671,760.

The purpose of the felt fabric is to increase the boundary surface necessary for the electrochemical reaction, between the sulfur or the alkali polysulfide produced during the discharge, and the cathodic current collector, of which the felt fabric can be considered as an extension. In addition, this makes the distance between the electrolyte and the cathodic current collector, extended in this manner, small, so that the resistance of the sulfur or the sodium polysulfide contributes less to the cell's internal resistance.

An important disadvantage of such a cell is, however, that it can be only partially recharged with large currents. In a Na/S cell, for instance, this disadvantage is related to the fact that sulfur (with small percentages of dissolved $Na_2S_5$) and $Na_2S_5$ (with percentages of dissolved sulfur) form two immiscible liquids at the operating temperature of such a cell, which is between 300° and 350° C. For, if a discharged Na/S cell, which contains $Na_2S_3$ in the cathode chamber, is recharged, then sulfides with more sulfur are formed first until $Na_2S_5$ has been produced in the entire cathode chamber or at least locally. Upon further charging, liquid sulfur is then produced at the points with a high electrochemical reaction rate. The sulfur being an insulator, blocks the electrochemical processes at these points.

As the electrochemical processes in a graphite felt of homogeneous structure, i.e. substantially the same pore radius, conductivity etc. independent of the distance from the solid electrolyte, take place in the vicinity of the electrolyte wall, sulfur is formed preferentially in the vicinity thereof. When the entire electrolyte surface is covered with sulfur, the entire amount of $Na_2S_5$ in the rest of the cathode chamber cannot contribute any more to the electrochemical reaction. This then reduces the capacity of such a cell to such an extent that the advantage of a high energy content, which exists in principle, is largely lost.

In storage cells with high current densities, such as are being planned for the propulsion of electric vehicles and for covering peak loads in electrical networks, however, it is particularly important that recharging as rapidly and completely as possible be feasible.

SUMMARY OF THE INVENTION

An object of the present invention is to provide an electrical storage cell or battery based on an alkali metal and sulfur which can be rapidly recharged to a high energy content, particularly for use in covering peak loads in electrical networks.

With the foregoing and other objects in view there is provided in accordance with the invention an electrochemical storage cell or battery based on an alkali metal and sulfur having at least one anode chamber and at least one cathode chamber separated from each other by an ion-conducting solid electrolyte, and a felt fabric of graphite or carbon contained in the cathode chamber, including a coarse-pore felt and a fine-pore felt located in the cathode chamber with the coarse-pore felt disposed in the vicinity of the solid electrolyte, and the fine-pore felt disposed further away from the solid electrolyte.

In accordance with the invention there is provided an electrochemical storage cell or battery based on an alkali metal and sulfur having at least one anode chamber and at least one cathode chamber separated from each other by an ion-conducting solid electrolyte, and a felt fabric of graphite or carbon contained in the cathode chamber, which includes a felt of lower electric conductivity and a felt of higher electric conductivity located in the cathode chamber with the felt of lower electric conductivity disposed near the solid electrolyte and the felt of higher electric conductivity disposed further away from the solid electrolyte.

There is provided in accordance with the invention an electrochemical storage cell or battery based on an alkali metal and sulfur having at least one anode chamber and at least one cathode chamber separated from each other by ion-conducting solid electrolyte, and a felt fabric of graphite or carbon contained in the cathode chamber, which includes a coarse-pore felt of low electric conductivity and a fine-pore felt of higher conductivity located in the cathode chamber with the coarse-pore felt of low conductivity disposed near the solid electrolyte and the fine-pore felt of higher conductivity disposed further away from the solid electrolyte. Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
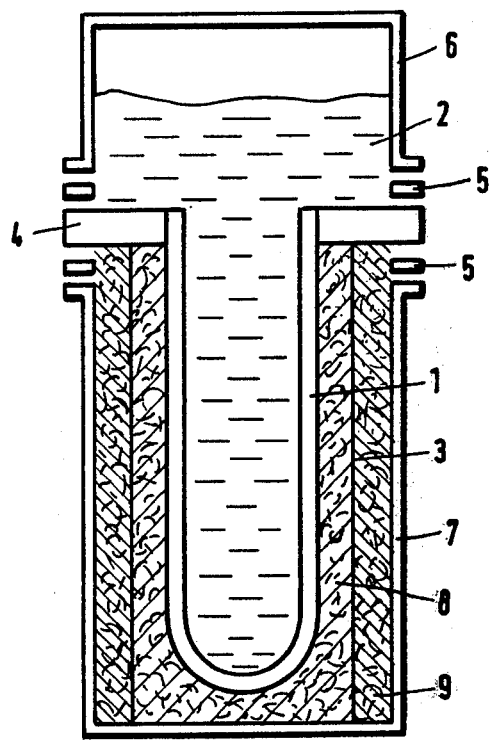
FIG. 1 diagrammatically illustrates Na/S cell in which graphite felt fabrics of different porosity are disposed in the cathode chamber.

An important factor on rapidly charging the cell and increasing the capacity is to limit the internal resistance which, in turn, means preventing major accumulations of sulfur as an insulator.

We have found the behavior of sulfur and $Na_2S_5$ is different toward graphite in that graphite is well wetted by sulfur, but wetted relatively poorly by $Na_2S_5$. In view of this difference the coarse-pore felt is disposed in the cathode chamber in the vicinity of the solid electrolyte, and the fine-pore felt is disposed in the region further removed from the solid electrolyte. The average fiber spacing of the coarse-pore felt is larger than that of the fine-pore felt by a factor of at least 5. Because of the better wetting of the sulfur, melted sulfur and melted $Na_2S_5$ are distributed in two adjoining graphite felt fabrics with pores of different sizes in such a manner that the sulfur is located after some time mainly in the felt with the narrow pores. This can be demonstrated as follows:

Two graphite felt fabrics were stacked on top of each other in a test tube that fine-pore felt was at the bottom of the test tube, 3 cm high, and above it was coarse-pore felt, 3 cm high. The fine-pore felt consisted of graphite fibers with a diameter of 20 $\mu$m, and the coarse-pore felt of fibers with a diameter of about 150 $\mu$m. Equal amounts of sulfur and $Na_2S_5$ were melted in a vacuum above the felt. The amount of these substances was measured so that it just filled the pore volume of the two felts in the closed condition. After melting the sulfur and $Na_2S_5$, 1-atmosphere nitrogen was admitted at the top of the test tube, causing the melt to be pressed into the felt. After one hour, the test tube was allowed to cool down. The substances in the two felt sections were analyzed chemically. It was found the fine-pore felt at the bottom contained mainly sulfur while the coarse-pore felt at the top contained mainly $Na_2S_5$. The density difference would have led one to expect the inverse distribution.

The effect of the separation of sulfur and $Na_2S_5$ is therefore utilized in an Na/S cell by placing the coarse-pore felt in the cathode chamber in the vicinity of the electrolyte and placing the fine-pore felt further away from the solid electrolyte. If sulfur is then formed in the vicinity of the electrolyte when the cell is charged, the sulfur is sucked into the further-removed fine-pore felt. The $Na_2S_5$ penetrates into the coarse-pore felt in the vicinity of the electrolyte. The charging can be continued until the fine-pore felt is completely filled with sulfur.

In most cases an average fiber spacing of 1 to 4 mm is advisable for the coarse-pore region near the electrolyte, and an average fiber spacing of 0.06 to 0.2 mm for the fine-pore region away from the electrolyte.

The felt in the vicinity of the electrolyte may be provided with recesses, with one dimension of the recess substantially larger than the two other dimensions. In case of a tubular, concentric arrangement, these recesses preferably have the form of ring canals. The effect of such canals is the same as that of coarse pores. Graphite felt with low electric conductivity is placed adjacent the electrolyte tube. Felt with higher electric conductivity is placed further away from the electrolyte tube. A difference in electric conductivity by a factor 10 or more between the felts of low and higher conductivity is preferred.

The electrochemical processes, with homogeneous distribution of the felt, are confined to the vicinity of the solid electrolyte wall because of the about 10-times higher conductivity of the felt as compared to that of the melt. With the difference in conductivity of the felt in accordance with the invention, the electrochemical processes now take place also in the regions further removed from the solid electrolyte, so that, with the same total current, less sulfur is produced at the electrolyte and the formation of an insulating layer is delayed. The two measures inhibiting the formation of a sulfur layer, i.e. the different porosity and the different electric conductivity of the felt can be applied together.

To fully utilize the effect of the different porosity of the felt, it is advisable to use, in the case of felt with a fibrous structure, an average fiber spacing of 1 to 4 mm or more for the coarse-pore region near the electrolyte, and an average fiber spacing of 0.1 to 0.2 mm or less for the fine-pore region away from the electrolyte.

In regard to the different conductivities of the felt, a value smaller than 1 $ohm^{-1}cm^{-1}$ is preferred for the region near the electrolyte and a value larger than 10 $ohm^{-1}cm^{-1}$ for the region further away from the electrolyte. The ratio $\sigma_{near}:\sigma_{far}$ should in any case be greater than 10, but if possible, greater than 100, as the conductivity ratio of the melt to the felt, which is normally 1:10, should be the inverse to aid in rapid and more complete rechargeability of the electrochemical storage cell.

Referring to FIG. 1, numeral 1 designates the solid electrolyte; 2 the anode chamber in which sodium is disposed as the anodic reactant; and 3, the cathode chamber in which sulfur or sodium polysulfide and graphite felt are located. An insulating ring 4 is tightly connected to the solid electrolyte 1. The two housing parts 6 and 7 are pressed by means of two sealing rings 5 against the insulating ring 4 and the cell is thus sealed. In the cathode chamber 3, there is an inner, coarse-pore graphite felt ring 8 and an outer fine-pore graphite felt ring 9. The effect of the two felts on the rechargeability of the cell has been described above.

Figure 2:
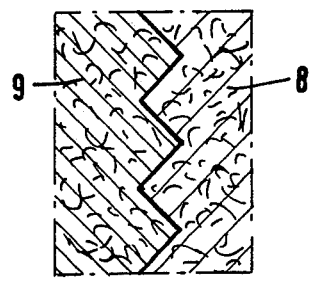
FIG. 2 is a detail showing the coarse-pore inner felt bordering the outer, finer-pore felt.

The two felt fabrics can border each other in the manner indicated in FIG. 2. Numeral 8 designates the coarse-pore, inner felt and 9, the outer, fine-pore felt. Because of the larger contact area, the exchange between $Na_2S_5$ and S is faster.

Figure 3:
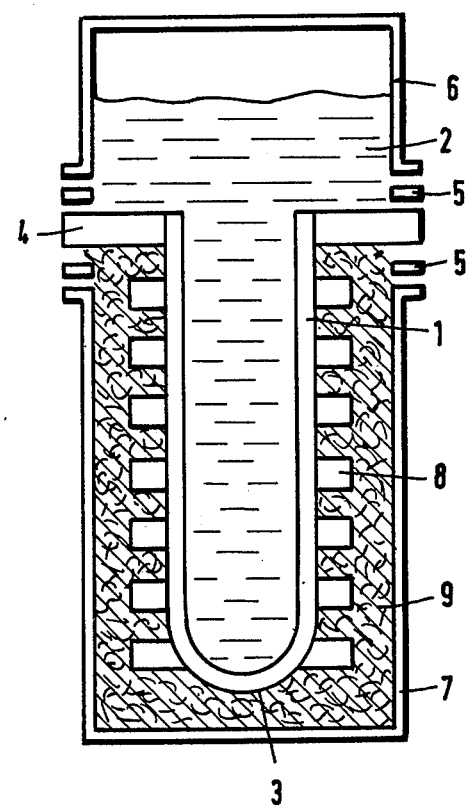
FIG. 3 diagrammatically illustrates a Na/S cell with annular canals free of felt in the cathode chamber.

FIG. 3 shows another form of Na/S cell in accordance with the invention. The numbers 1 to 7 correspond to those in FIG. 1. Numeral 9 designates a fine-pore graphite felt in which annular recesses 8 are arranged. The recesses have the same effect as coarse-pore felt.

Figure 4:
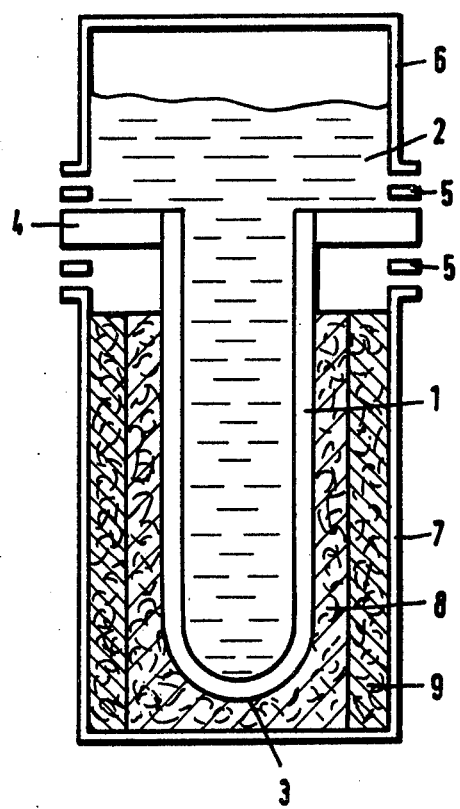
FIG. 4 diagrammatically illustrates a Na/S cell in which the cathode chamber is filled with two felt fabrics of different electric conductivities.

FIG. 4 shows a further form of Na/S cell in accordance with the invention. The numbers 1 to 7 again correspond to those of FIG. 1. Numeral 8 designates a graphite felt of lower effective conductivity, which can be prepared, for instance, by depositing poorly-conducting pyrolytic carbon on commercially available felt; numeral 9 designates such a commercially available felt.

Figure 5:
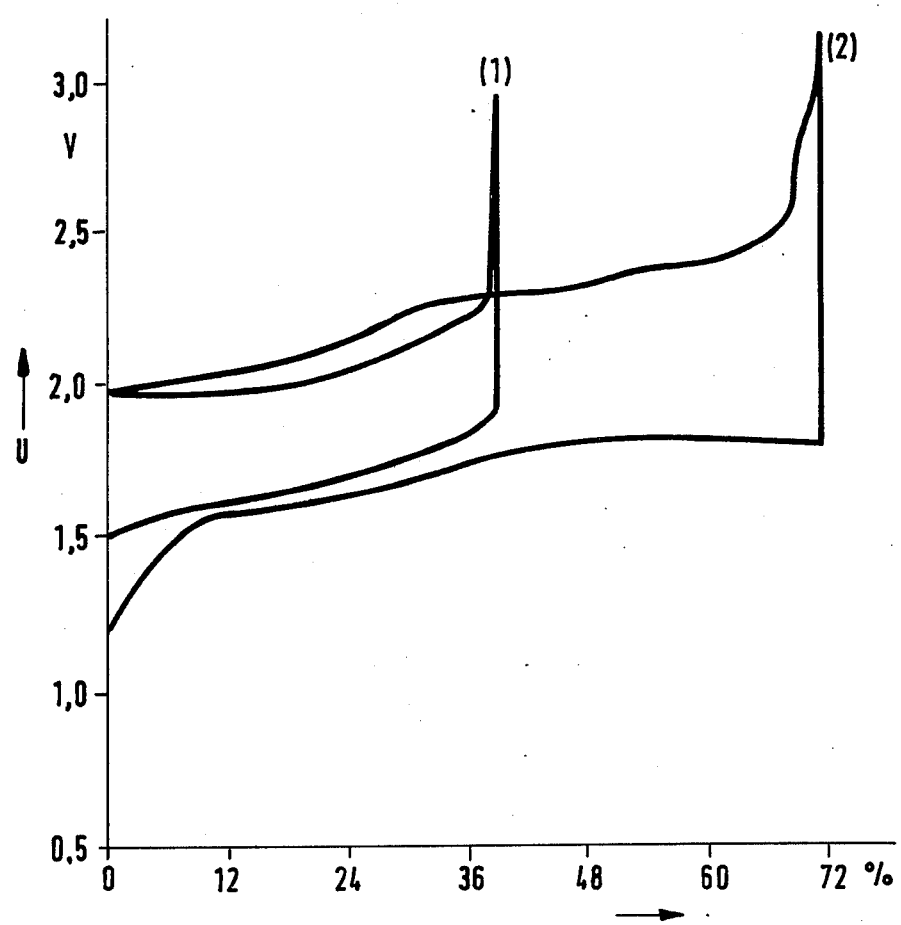
FIG. 5 shows the charging/discharging curves of two cells.

In FIG. 5, two charging/discharging curves of two cells are shown. The tests were carried out in Na/S cells with $\beta$-$Al_2O_3$ tubes, 5 cm long and closed at the bottom, with an outside diameter of 11 mm and an inside diameter of 9 mm. The tubes were fused to glass at the top. They were in a glass vessel with a fused-in cup-shaped graphite current collector.

The 0.4-mm wide gap between the current collector and the electrolyte tube was filled with graphite felt (fiber diameter, 20 μm; porosity, about 95%). In two cases, vertical channels were provided in the felt. Sodium was filled into the interior of the electrolyte tube and sulfur into the outer space. The tests were carried out at 300° C. There was pure nitrogen above the melts.

The abscissa indicates the relative capacity of the cell. This is understood to be the ratio of the measured capacity to the theoretical capacity. The latter is that capacity which is obtained if the overall stoichiometry in the cathode chamber changes during the discharge from pure sulfur to $Na_2S_3$. Curve 1 refers to a cell with a homogeneous pore structure according to the state of the art. Curve 2 refers to a cell as per FIG. 1. Both curves correspond to a charging current density of 65 mA/cm$^2$ and twice the discharging current density.

As comparison of the curves will show, the relative capacity is improved to a very substantial degree by the invention. Equally good results were obtained in the case of felt of different conductivities.

There are claimed:

1. In an electrochemical storage cell or battery based on an alkali metal and sulfur having at least one anode chamber and at least one cathode chamber separated from each other by an ion-conducting solid electrolyte, and a felt fabric of graphite or carbon contained in the cathode chamber, the improvement which comprises a coarse-pore felt and a fine-pore felt located in the cathode chamber with the coarse-pore felt disposed in the vicinity of the solid electrolyte, and the fine-pore felt disposed further away from the solid electrolyte.

2. Electrochemical storage cell or battery according to claim 1, wherein average fiber spacing of the coarse-pore felt is larger than that of the fine-pore felt by a factor of at least 5.

3. Electrochemical storage cell or battery according to claim 2, wherein said coarse-pore felt in the region close to the solid electrolyte has an average fiber spacing of 1 to 4 mm, and said fine-pore felt further away from the solid electrolyte has an average fiber spacing of 0.06 to 0.2 mm.

4. In an electrochemical storage cell or battery based on an alkali metal and sulfur having at least one anode chamber and at least one cathode chamber separated from each other by ion-conducting solid electrolyte, and a felt fabric of graphite or carbon contained in the cathode chamber, the improvement which comprises a coarse-pore felt of low electric conductivity and a fine-pore felt of higher conductivity located in the cathode chamber with the coarse-pore felt of low conductivity disposed near the solid electrolyte and the fine-pore felt of higher conductivity disposed further away from the solid electrolyte.

5. Electrochemical storage cell or battery according to claim 4, wherein average fiber spacing of the coarse-pore felt is larger than that of the fine-pore felt by a factor of at least 5, and wherein the electric conductivity of the fine-pore felt is higher than that of the coarse-pore felt by a factor of at least 10.

6. Electrochemical storage cell or battery according to claim 1, wherein the alkali metal is sodium.

7. Electrochemical storage cell or battery according to claim 8, wherein the alkali metal is sodium.

8. In an electrochemical storage cell or battery based on an alkali metal and sulfur having at least one anode chamber and at least one cathode chamber separated from each other by an ion-conducting solid electrolyte, and a felt fabric of graphite or carbon contained in the cathode chamber disposed adjacent the solid electrolyte, the improvement which comprises having a plurality of recesses in said felt along the surface of the felt adjacent the solid electrolyte.

9. Electrochemical storage cell or battery according to claim 8, wherein the alkali metal is sodium.

* * * * *